(12) United States Patent
Morales

(10) Patent No.: US 10,967,800 B2
(45) Date of Patent: Apr. 6, 2021

(54) GARBAGE TRUCK REAR RIDER ASSEMBLY

(71) Applicant: Nilo Morales, Miami, FL (US)

(72) Inventor: Nilo Morales, Miami, FL (US)

( * ) Notice: Subject to any disclaimer, the term of this patent is extended or adjusted under 35 U.S.C. 154(b) by 0 days.

(21) Appl. No.: 16/539,625

(22) Filed: Aug. 13, 2019

(65) Prior Publication Data

US 2021/0046878 A1 Feb. 18, 2021

(51) Int. Cl.
*B60R 3/00* (2006.01)
*B65F 3/00* (2006.01)

(52) U.S. Cl.
CPC .......... *B60R 3/00* (2013.01); *B65F 2003/003* (2013.01)

(58) Field of Classification Search
CPC ....................................................... B60R 3/00
See application file for complete search history.

(56) References Cited

U.S. PATENT DOCUMENTS

| 6,017,045 A | 1/2000 | Dermody |
| 6,076,844 A | 6/2000 | Stuart |
| 6,082,752 A | 7/2000 | Sumrall |
| 6,547,701 B1 * | 4/2003 | Eschenbach ......... A63B 22/001 482/57 |
| 7,293,788 B1 | 11/2007 | Bosley |
| 7,628,413 B2 | 12/2009 | Gallipoli |
| 8,251,392 B1 | 8/2012 | Peterson |
| 8,720,924 B2 | 5/2014 | Ruehl |
| 9,156,405 B1 | 10/2015 | Levesque |
| 2012/0018240 A1 * | 1/2012 | Grubaugh .............. B62D 51/02 180/273 |
| 2015/0273253 A1 * | 10/2015 | Lenz, Jr. ................ A62C 27/00 280/4 |

* cited by examiner

*Primary Examiner* — John D Walters
*Assistant Examiner* — James J Triggs

(57) ABSTRACT

A garbage truck rear rider assembly for allowing rear riders to safely secure themselves to a garbage truck includes a riding step and at least one grip bar. The riding step comprises a platform configured to be coupled to a garbage truck and stood on by a rider. A bounce protector is coupled to the platform and defines a foot cavity with the platform top side. An open bounce bottom side is coupled to a platform top side such that a bounce back side lies coplanar with a platform back side. An open bounce front side is configured to partially receive the rider's feet into the foot cavity. Each grip bar has a medial grip portion and a pair of arms perpendicularly extending from the grip portion. A distal end of each of the pair of arms is configured to be coupled to the garbage truck.

11 Claims, 4 Drawing Sheets

GARBAGE TRUCK REAR RIDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle riding mounts and more particularly pertains to a new vehicle riding mount for allowing rear riders to safely secure themselves to a garbage truck.

(2) Description of Related Art Including Information Disclosed Under 37 CFR 1.97 and 1.98

The prior art relates to vehicle riding mounts.

BRIEF SUMMARY OF THE INVENTION

An embodiment of the disclosure meets the needs presented above by generally comprising a riding step and at least one grip bar. The riding step comprises a platform having a platform top side, an open platform bottom side, a platform left side, a platform right side, a platform front side, and a platform back side. The platform back side is configured to be coupled to a garbage truck and the platform top side is configured to be stood on by a rider. A bounce protector is coupled to the platform. The bounce protector has a bounce back side, an open bounce front side, a bounce top side, and an open bounce bottom side defining a foot cavity with the platform top side. The open bounce bottom side is coupled to the platform top side such that the bounce back side lies coplanar with the platform back side. The bounce front side is configured to partially receive the rider's feet into the foot cavity. Each grip bar has a medial grip portion and a pair of arms perpendicularly extending from the grip portion. A distal end of each of the pair of arms is configured to be coupled to the garbage truck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
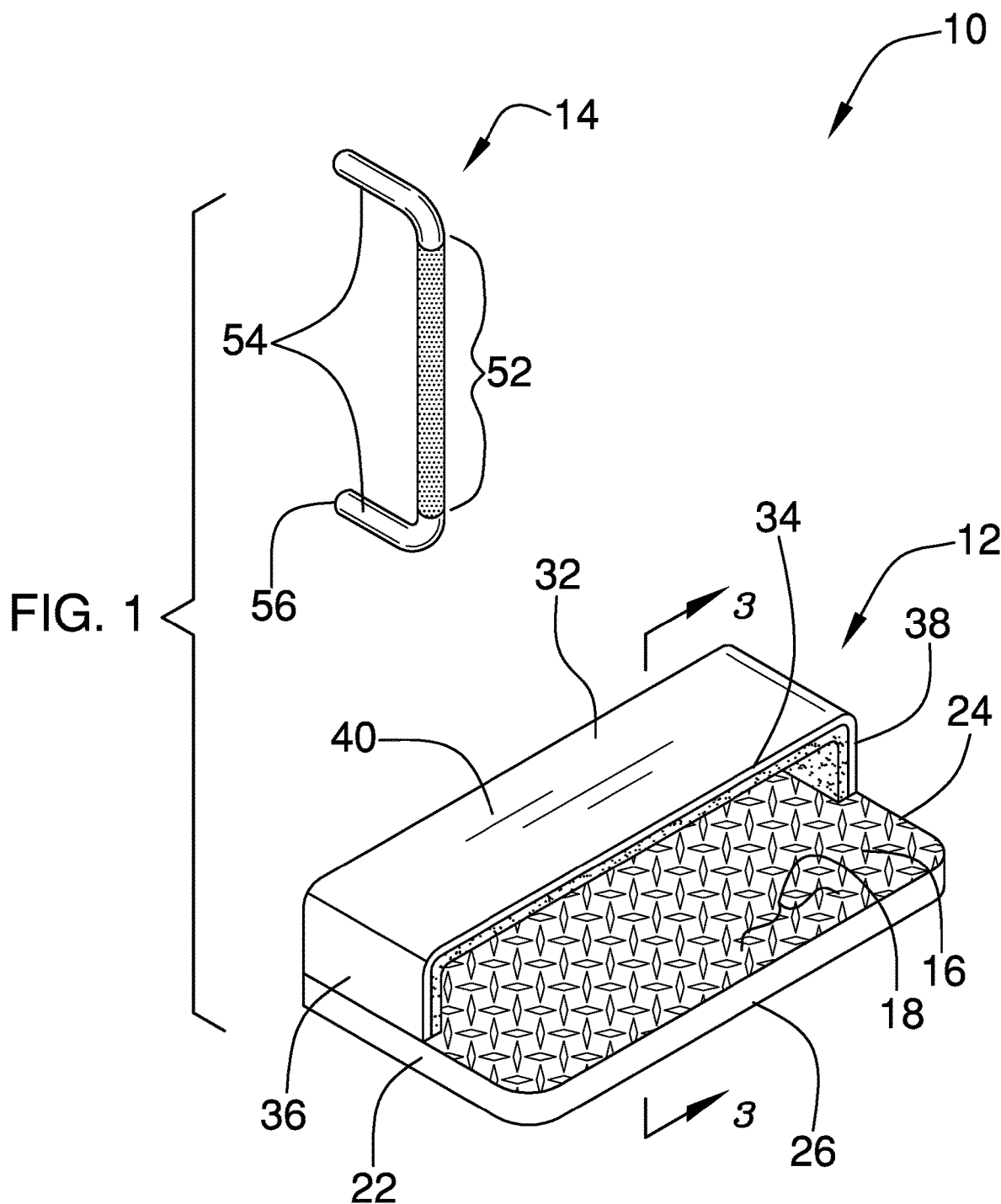
FIG. 1 is an isometric view of a garbage truck rear rider assembly according to an embodiment of the disclosure.
Figure 2:
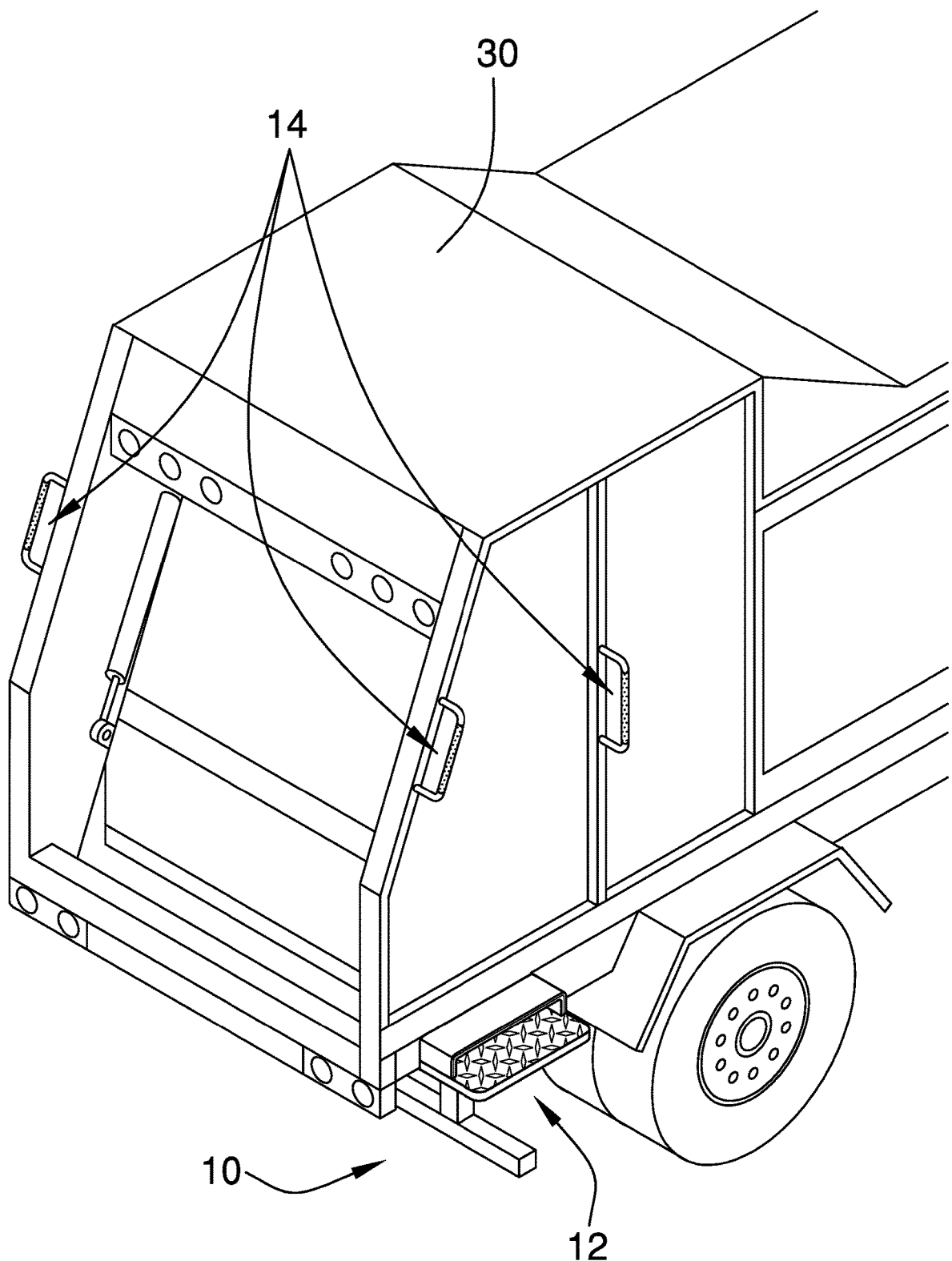
FIG. 2 is an in-use view of an embodiment of the disclosure.
Figure 3:
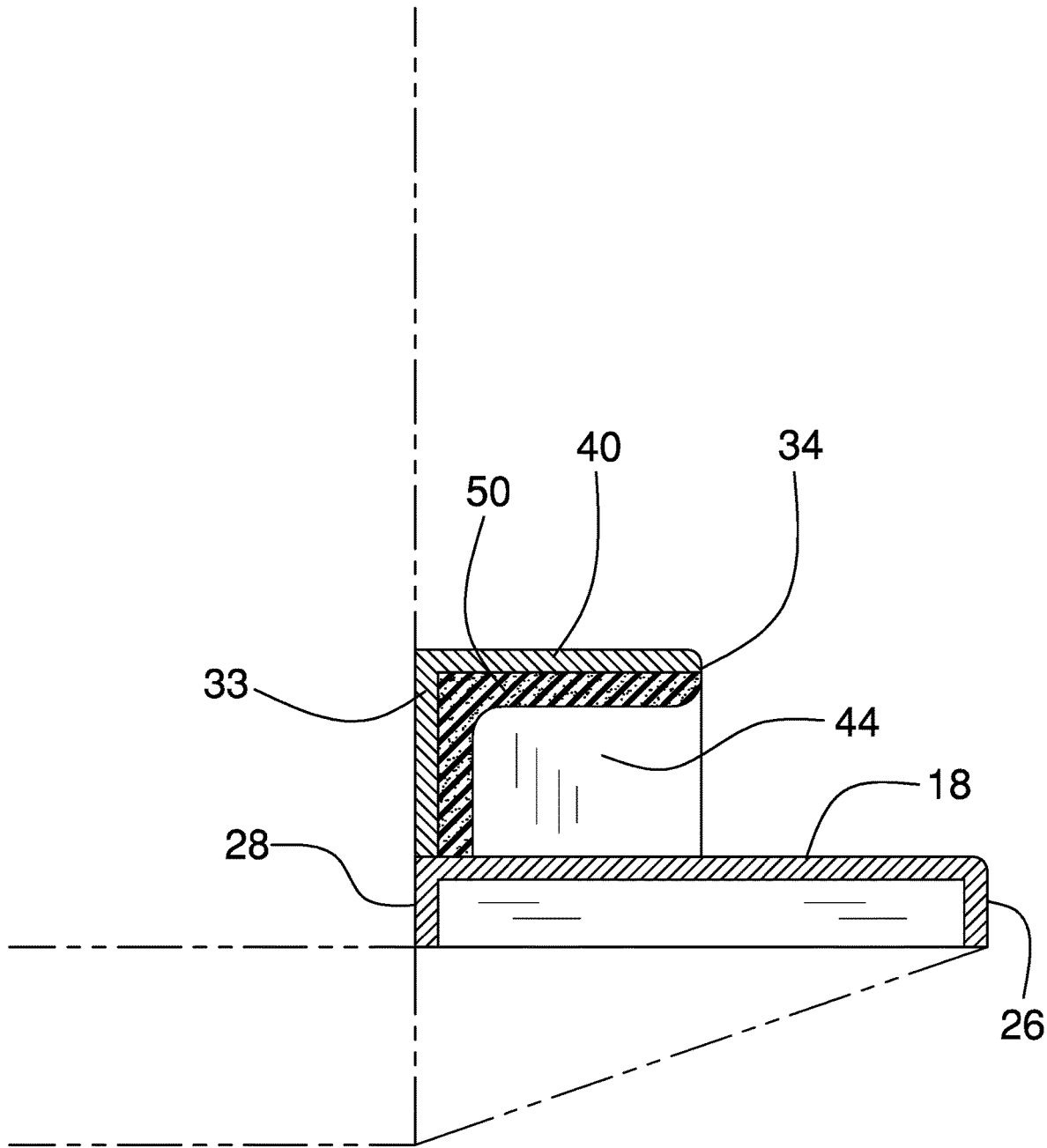
FIG. 3 is a cross-sectional view along the line 3-3 of FIG. 1 of an embodiment of the disclosure.
Figure 4:
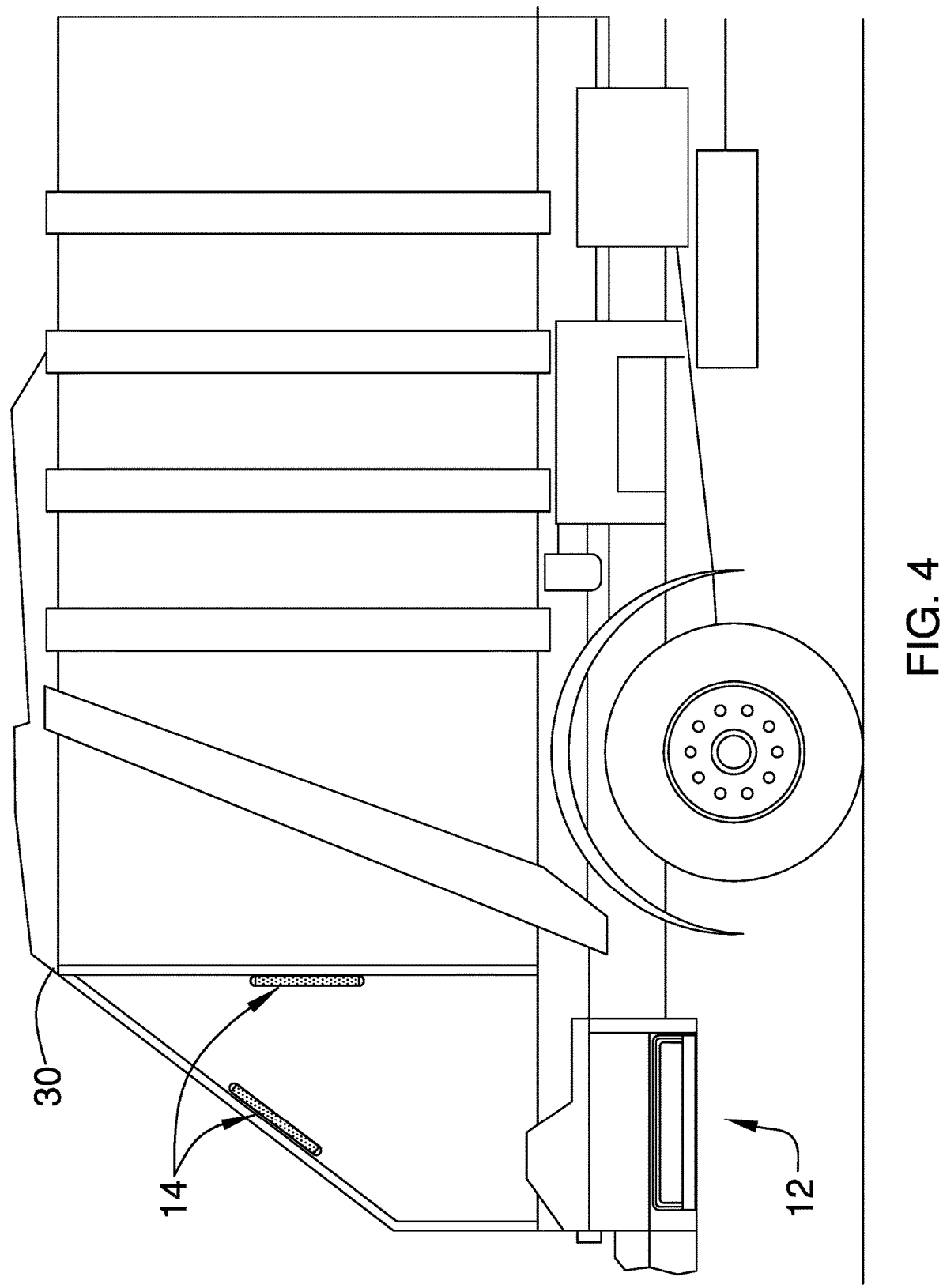
FIG. 4 is an in-use view of an embodiment of the disclosure.

With reference now to the drawings, and in particular to FIGS. 1 through 4 thereof, a new vehicle riding mount embodying the principles and concepts of an embodiment of the disclosure and generally designated by the reference numeral 10 will be described.

As best illustrated in FIGS. 1 through 4, the garbage truck rear rider assembly 10 generally comprises a riding step 12 and at least one grip bar 14. The riding step 12 comprises a platform 16 having a platform top side 18, an open platform bottom side 20, a platform left side 22, a platform right side 24, a platform front side 26, and a platform back side 28. The platform top side 18 may be diamond plate textured for improved grip. The platform 16 has rounded corners between the platform front side 26 and each of the platform left side 22 and the platform right side 24 to prevent injury. The platform back side 28 is configured to be coupled to a garbage truck 30 and the platform top side 18 is configured to be stood on by a rider.

A bounce protector 32 is coupled to the platform 16. The bounce protector 32 has bounce back side 33, an open bounce front side 34, a bounce left side 36, a bounce right side 38, a bounce top side 40, and an open bounce bottom side 42 defining a foot cavity 44 with the platform top side 18. The open bounce bottom side 38 is coupled to the platform top side 18 such that the bounce back side 33 lies coplanar with the platform back side 28. The bounce back side 33 may be configured to be coupled to the garbage truck 30 for increased surface area of attachment between the riding step 12 and the garbage truck 30. The bounce left side 36 and the bounce right side 38 may lie coplanar with the platform left side 22 and the platform right side 24, respectively. The bounce protector 32 has rounded edges between the bounce top side 40 and each of the bounce left side 36 and the bounce right side 38 to prevent injury. A bounce depth 46 of the bounce top side 40 may be half of a platform depth 48 of the platform top side 18. The bounce front side 34 is configured to partially receive the rider's feet into the foot cavity 44. When the garbage truck 30 bounces the rider's feet are secured in place by the pounce protector 32. A padding 50 is coupled to the bounce protector 32. The padding 50 is continuously disposed on the bounce back side 33 and the bounce top side 40 within the foot cavity 44 to protect and secure the user's feet while being held within the foot cavity 44.

Each grip bar 14 has a medial grip portion 52 and a pair of arms 54 perpendicularly extending from the grip portion 52. The grip portion 52 may be peened, knurled, or otherwise textured to prevent slippage. Each grip bar 14 may be rounded between the grip portion 52 and the pair of arms 54 to prevent injury. A distal end 56 of each of the pair of arms is configured to be coupled to the garbage truck 30.

In use, the rider stands on the platform 16 with his feet within the riding cavity 44 and secures the grip portion 52 of the grip bars 14 with his hands.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A garbage truck rear rider assembly comprising:
    a riding step, the riding step comprising:
        a platform, the platform having a platform top side, an open platform bottom side, a platform left side, a platform right side, a platform front side, and a platform back side, the platform back side being configured to be coupled to a garbage truck and the platform top side being configured to be stood on by a rider; and
        a bounce protector coupled to the platform, the bounce protector having a bounce back side, an open bounce front side, a bounce left side, a bounce right side, a bounce top side, and an open bounce bottom side defining a foot cavity with the platform top side, the open bounce bottom side being coupled to the platform top side such that the bounce back side lies coplanar with the platform back side, the bounce front side being configured to partially receive the rider's feet into the foot cavity, a distance between the open bounce front side and the bounce back side being less than a distance between the platform back said and the platform front side wherein the bounce protector is configured to receive a front portion of a foot while a heel of the foot is supported on the platform; and
    at least one grip bar, each grip bar having a medial grip portion and a pair of arms perpendicularly extending from the grip portion, a distal end of each of the pair of arms being configured to be coupled to the garbage truck.

2. The garbage truck rear rider assembly of claim 1 further comprising a padding coupled to the bounce protector, the padding being continuously disposed on the bounce back side and the bounce top side within the foot cavity.

3. The garbage truck rear rider assembly of claim 1 further comprising the platform top side being textured.

4. The garbage truck rear rider assembly of claim 1 further comprising the platform top side being diamond plate textured.

5. The garbage truck rear rider assembly of claim 1 further comprising the grip portion of each grip bar being textured.

6. The garbage truck rear rider assembly of claim 1 further comprising the grip portion of each grip bar being peened.

7. The garbage truck rear rider assembly of claim 1 further comprising the platform having rounded corners between the platform front side and each of the platform left side and the platform right side.

8. The garbage truck rear rider assembly of claim 1 further comprising the bounce protector having rounded edges between the bounce top side and each of the bounce left side and the bounce right side.

9. The garbage truck rear rider assembly of claim 1 further comprising each grip bar being rounded between the grip portion and the pair of arms.

10. A garbage truck rear rider assembly comprising:
    a riding step, the riding step comprising:
        a platform, the platform having a platform top side, an open platform bottom side, a platform left side, a platform right side, a platform front side, and a platform back side, the platform top side being diamond plate textured, the platform having rounded corners between the platform front side and each of the platform left side and the platform right side, the platform back side being configured to be coupled to a garbage truck and the platform top side being configured to be stood on by a rider;
        a bounce protector coupled to the platform, the bounce protector having a bounce back side, an open bounce front side, a bounce left side, a bounce right side, a bounce top side, and an open bounce bottom side defining a foot cavity with the platform top side, the open bounce bottom side being coupled to the platform top side such that the bounce back side lies coplanar with the platform back side, the bounce protector having rounded edges between the bounce top side and each of the bounce left side and the bounce right side, a distance between the open bounce front side and the bounce back side being less than a distance between the platform back said and the platform front side wherein the bounce protector is configured to receive a front portion of a foot while a heel of the foot is supported on the platform; and
        a padding coupled to the bounce protector, the padding being continuously disposed on the bounce back side and the bounce top side within the foot cavity; and
    at least one grip bar, each grip bar having a medial grip portion and a pair of arms perpendicularly extending from the grip portion, the grip portion being peened, each grip bar being rounded between the grip portion and the pair of arms, a distal end of each of the pair of arms being configured to be coupled to the garbage truck.

11. A garbage truck rear rider assembly and garbage truck system comprising:
   a garbage truck;
   a riding step, the riding step comprising:
      a platform, the platform having a platform top side, an open platform bottom side, a platform left side, a platform right side, a platform front side, and a platform back side, the platform top side being diamond plate textured, the platform having rounded corners between the platform front side and each of the platform left side and the platform right side, the platform back side being coupled to the garbage truck and the platform top side being configured to be stood on by a rider;
      a bounce protector coupled to the platform, the bounce protector having a bounce back side, an open bounce front side, a bounce left side, a bounce right side, a bounce top side, and an open bounce bottom side defining a foot cavity with the platform top side, the open bounce bottom side being coupled to the platform top side such that the bounce back side lies coplanar with the platform back side, the bounce protector having rounded edges between the bounce top side and each of the bounce left side and the bounce right side, a distance between the open bounce front side and the bounce back side being less than a distance between the platform back said and the platform front side wherein the bounce protector is configured to receive a front portion of a foot while a heel of the foot is supported on the platform; and
   a padding coupled to the bounce protector, the padding being continuously disposed on the bounce back side and the bounce top side within the foot cavity; and
   at least one grip bar, each grip bar having a medial grip portion and a pair of arms perpendicularly extending from the grip portion, the grip portion being peened, each grip bar being rounded between the grip portion and the pair of arms, a distal end of each of the pair of arms being coupled to the garbage truck.

\* \* \* \* \*